United States Patent Office 3,318,959
Patented May 9, 1967

3,318,959
SYMMETRICALLY TERMINATED POLY-
PHENYLENE ETHER
Willem F. H. Borman, Dalton, Mass., assignor to General Electric Company, a corporation of New York
No Drawing. Filed Dec. 3, 1963, Ser. No. 327,821
2 Claims. (Cl. 260—613)

The present invention relates to novel copolymer materials and to the novel components from which these copolymers may be prepared as well as to the methods of preparation of the copolymers and components. More specifically the present invention relates to the preparation of copolymer materials having polyphenyl ether components therein, to their method of preparation and to the polyphenyl ether components which are in a form suitable for preparation of copolymers.

Recently methods have been developed for the formation of novel polyphenylene oxide materials of high molecular weight.

One of the most efficient methods of forming these materials is described in the co-pending application of Hay, Ser. No. 212,128, filed July 24, 1962. The method comprises the oxidative coupling of a monovalent phenol using a solution of an amine-basic cupric salt complex catalyst as an oxygen carrying intermediate. The phenols polymerized by Hay may be represented by the following general formula

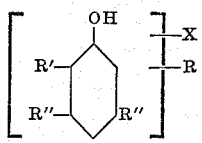

wherein X is a substituent selected from the group consisting of hydrogen, chlorine, bromine, and iodine; R is a monovalent substituent selected from the group consisting of hydrogen, hydrocarbon radicals, hydrocarbonoxy radicals, and halohydrocarbon radicals having at least two carbon atoms between the halogen atom and phenol nucleus; and R' and R'' are the same as R and, in addition, halogen. The polymers formed by the Hay process have an unusual combination of properties which render them useful in many applications. Inherently, a number of the desirable properties of the polyphenylene oxide polymeric materials may be attributed to the presence of the polyphenyl ether monomeric units of the polymer although the phenyl nucleus may have various substituents thereon.

It has now been found that many of the desirable properties of polymeric materials having the polyphenyl ether chain may be produced in a broader range of property characteristics by forming copolymers in which the polyphenyl ether segments are included as blocks in the backbone chain of the copolymer structures.

Accordingly, one of the broader objects of the present invention is to provide novel compositions incorporating polyphenyl ether segments where these segments are themselves of relatively short chain length by comparison to the high molecular weight of polyphenyl ether polymers which can be formed by the process described in the Hay application referred to above.

Another object of the present invention is to form novel copolymers incorporating therein relatively short chain polyphenyl ether segments.

A further object of the present invention is to provide novel polyphenyl ether segments of relatively short chain length.

Still another object is to provide methods of forming the novel compositions of the present invention.

Further objects and advantages of the present invention will be in part apparent and in part pointed out in the description which follows.

The polyphenylene oxides with which the present invention is concerned are those formed from phenols having the following formula

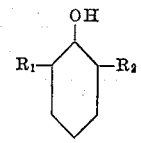

wherein $R_1$ and $R_2$ are members selected from the group consisting of lower alkyl and aryl. Typical examples of phenols corresponding to the above formula include 2,6-dimethylphenol, 2,6-diethylphenol, 2,6-dibutylphenol, 2,6-dilaurylphenol, 2,6-dipropylphenol, 2,6-diphenylphenol, 2-methyl-6-isobutylphenol, 2-methyl-6-phenylphenol, 2,6-dibenzylphenol, etc.

It is well known to the art, that copolymerization of two or more monomers leads to products with unique properties. Examples are styrene-butadiene rubber (SBR), acrylonitrile-butadiene-styrene (ABS), ethylene-propylene rubber, ethylene-vinylacetate copolymers and many others. In all these cases, the monomers polymerize basically by the same mechanism, so that copolymerization is easily achieved.

On the other hand, the polymerization of substituted phenols according to A. S. Hay proceeds by a unique mechanism, applicable most appropriately to phenols and diethynyl benzenes, and direct copolymerization with other monomers is therefore not feasible. Moreover, the polymerization products of substituted phenols are highly unreactive materials, which contain at best only one reactive terminal end group per polymer molecule, as more specifically described below.

A primary object of this invention therefore is to provide polyphenylene ether molecules terminated on both ends by reactive groups, so that a difunctional unit is obtained which may be incorporated in block copolymers. A more specific object of this invention is to provide methods of preparing polyphenylene ether molecules, terminated on both ends by OH groups. Such molecules have unique properties for preparation of block copolymers with, polycarbonates reactive with aromatic hydroxyl groups.

In one of its broadest aspects the object of preparing relatively short segment polyphenyl ethers is achieved in accordance with this invention by hydrolytic severance of a non-hydroxy portion from a mono-hydroxy terminated polyphenylene ether chain. While this hydrolytic severence may be a severence of the polyphenylene ether chain itself, it may also proceed by severence of a non-ether linkage, as a halogen linkage. However, the severence procedure of this invention must be carried out on a mono-hydroxy terminated polyphenylene ether starting material having at least two adjacent ether linked diphenyl ethers.

By relatively short segment polyphenyl ether chains, as used herein, is meant chains of a preferred length of between three and one hundred repeating units or more.

A number of the more specific manners in which the present invention may be carried into effect will be made clearer by a consideration of the following examples. It will be understood, however, that these examples are givprimarily for illustrative purposes and that the scope of the invention is not to be understood as limited thereto except as may be required by the claims at the end of his application.

Example 1

A reaction flask, equipped with a stirrer and heating mantle, was charged with five hundred milliliters of pyridine containing 50 grams of poly-2,6-dimethylphenylene ether dissolved in the pyridine. The solution was heated to boiling (114° C.) and approximately 20 grams of phosgene gas were passed through the solution for a period of about one-half hour. Heating was continued for another half hour after which the solution was allowed to cool.

Twenty-five milliliters of water were added to decompose the excess phosgene-pyridine complex and the resulting solution was added to an excess of methanol to precipitate the resin product therefrom. The resin was filtered off, washed with methanol, and twice redissolved in chloroform and reprecipitated with methanol. The product separated in this way was dried in vacuum at 25° C. over a period of about four hours.

As a control, a quantity of the poly-2,6-dimethylphenylene oxide used as a starting material in the above reaction was dissolved in chloroform and then reprecipitated with methanol and dried in vacuum at 125° C. under conditions essentially identical to those employed in precipitating and drying the product formed by the above reaction. The intrinsic viscosity of the two materials, both the phosgenated and the reprecipitated starting material were determined in chloroform solution at 30° C. The reprecipitated starting material had an intrinsic viscosity of 0.13 dl./g. and the phosgenated material had an intrinsic viscosity of 0.18 dl./g.

The hydroxyl concentration of both materials was determined using infrared absorption and the concentration of the reprecipitated material was found to be 0.3% whereas that of the phosgenated material was found to be 0.15%.

The concentration of C=O groups in the two materials was also determined on a relative basis using infrared absorption analysis and it was found that, although these bonds were absent in the reprecipitated starting material, they were strongly evident in the phosgenated materials.

Example 2

Approximately twenty grams of poly-2,6-dimethylphenylene ether were suspended in a solution of 50 grams of sodium hydroxide in 100 grams of water. The polymer used for this purpose had an intrinsic viscosity in chloroform at 30° C. of 0.75 dl./g. The suspension was heated in an autoclave at 315 to 320° C. for two hours. The warming up and cooling off of the autoclave required an additional two hours for each operation.

The products of this reaction were filtered and the polymer was washed with water and dried. It was then dissolved in chlorobenzene and precipitated with methanol. The yield of the reaction was 19 grams.

The product formed in this way had an intrinsic viscosity in chloroform at 30° C. of 0.32 dl./g. This corresponds to a number average molecular weight of 15,000 to 20,000. The hydroxyl content of the composition as determined by infrared absorption was 0.25% corresponding to a hydroxyl content of 2.3 to 3 hydroxyl groups per molecule.

Example 3

A reaction flask was provided with means for stirring and cooling a solution introduced therein. A solution was formed in the flask to contain the following ingredients in 1,000 milliliters of chloroform.

| | Grams |
|---|---|
| 2.6 xylenol (0.83 mol.) | 100 |
| Cuprous chloride (0.004 g. atom of copper) | 0.4 |
| N,N,N',N'-tetramethyl-1,3-butanediamine (TMBD, 1.25 g. mol.) | 180 |

The contents of the reactor were cooled by partial immersion of the flask in an ice bath as the contents were stirred.

During the period of the next 50 minutes 100 milliliters of chloroform containing 135 grams of bromine (0.84 g. mol.) were added to the reaction flask. The ice bath was removed following the addition of the solution of bromine and chloroform and the stirring was continued for about two hours.

Following this reaction period an excess of methanol was added to the reaction mixture; polymer product which precipitated was filtered off and then washed with additional methanol. It was redissolved in chloroform and reprecipitated by the addition of methanol.

The polymer product formed in this way was analyzed for bromine and found to contain $0.326 \times 10^{-3}$ equivalents of bromine per gram of polymer.

Example 4

Ten grams of a product similar to that prepared in Example 3 but containing $0.98 \times 10^{-3}$ equivalent of bromine per gram of polymer was dispersed with isobutanol in an excess of concentrated KOH solution. The suspension was introduced into, heated and stirred in an autoclave at a temperature of 190–210° C. for seven hours. The reaction mixture was allowed to cool overnight and was then filtered. The polymer product separated was washed with water and with methanol. It was then dissolved in chloroform and reprecipitated with methanol.

The resultant product was analyzed chemically and found to contain a residual bromine content of $0.14 \times 10^{-3}$ equivalents of bromine per gram. The material was analyzed by infrared absorption and two absorption maxima of equal intensity were found in the infrared spectrum at 2.77 and 2.83 microns. These absorption maxima are ascribed to hindered and unhindered phenolic OH deemed to be present at opposite ends of each polyphenyl ether segment, as shown in the following formula:

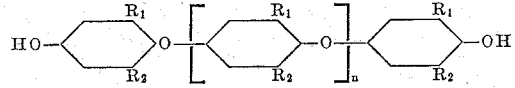

wherein $n$ is an integer of at least unity, and $R_1$ and $R_2$ are selected from the group of monovalent radicals consisting of aryl and lower alkyl wherein the carbon attached to the segment is other than a tertiary carbon.

The total hydroxyl content of the material prepared in this example was estimated from infrared spectra to be $0.51 \times 10^{-3}$ equivalents per gram. The intrinsic viscosity of the material in chloroform at 30° C. was 0.145 dl./g.

From the foregoing it will be apparent that the present invention provides the method for forming blocks of polyphenyl ethers having the same end grouping at each end of the block and that accordingly this makes possible the formation of novel block copolymers containing polyphenyl ether blocks. While the method is described with particular reference to the formation of polyphenyl ether blocks having a terminal hydroxy group at each end thereof, it is apparent that the method may be applied to the formation of blocks with other symmetrical end groupings.

It should, of course, be apparent to those skilled in the art, that changes may be made in the particular embodiments of the invention described which are within the full intent and scope of the invention as defined by the appended claims.

What is claimed is as follows:

1. Symmetrically terminated polyphenylene ether chains of the formula

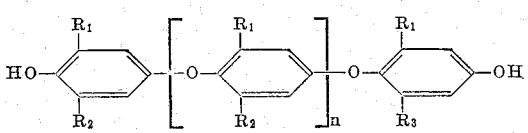

wherein $R_1$ and $R_2$ are members selected from the group consisting of lower alkyl and aryl and wherein the carbon atom attached to the phenylene nucleus is other than a tertiary carbon atom and $n$ is a whole integer equal to from 1 to 100.

2. Symmetrically terminated polyphenylene ether chains of the formula

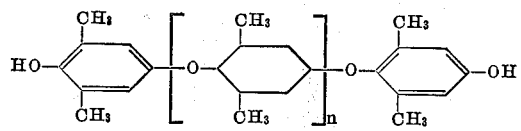

wherein $n$ is a whole integer equal to from 1 to 100.

References Cited by the Examiner

UNITED STATES PATENTS 3,148,172  9/1964  Fox _____ 260—47

FOREIGN PATENTS 835,464  5/1960  Great Britain.
932,424  7/1963  Great Britain.
1,259,934  3/1961  France.

SAMUEL H. BLECH, *Primary Examiner.*

WILLIAM H. SHORT, *Examiner.*

J. C. MARTIN, M. GOLDSTEIN, *Assistant Examiners.*